United States Patent [19]

Leenhouts

[11] 4,090,120

[45] May 16, 1978

[54] METHOD AND MEANS FOR CONTROLLING ENERGIZATION BY COMMANDS

[75] Inventor: Albert C. Leenhouts, Harwinton, Conn.

[73] Assignee: The Superior Electric Company, Bristol, Conn.

[21] Appl. No.: 575,737

[22] Filed: May 8, 1975

[51] Int. Cl.² .................... G05B 11/18; G05B 19/10
[52] U.S. Cl. ................................ 318/567; 318/570; 318/590; 318/600; 318/625
[58] Field of Search ............... 318/570, 573, 574, 568, 318/601, 600, 603, 685, 590, 625, 567

[56] References Cited

U.S. PATENT DOCUMENTS

| | | | |
|---|---|---|---|
| 3,497,780 | 2/1970 | Leenhouts | 318/574 |
| 3,749,995 | 7/1973 | Leenhouts | 318/570 |

*Primary Examiner*—Robert J. Hickey
*Attorney, Agent, or Firm*—Ernest M. Junkins

[57] ABSTRACT

A system for directing sequential commands to a plurality of device control circuits, each of which is capable of being individually addressed and controlled to perform one of a plurality of modes of energization by the input commands. The control circuits are used to control energization of devices, such as peripheral devices of numerical control machines and may utilize feedback status signals from the devices, in some modes, to regulate the receiving of further input commands. The commands may be each acted upon sequentially or some may be grouped to be acted upon simultaneously.

23 Claims, 4 Drawing Figures

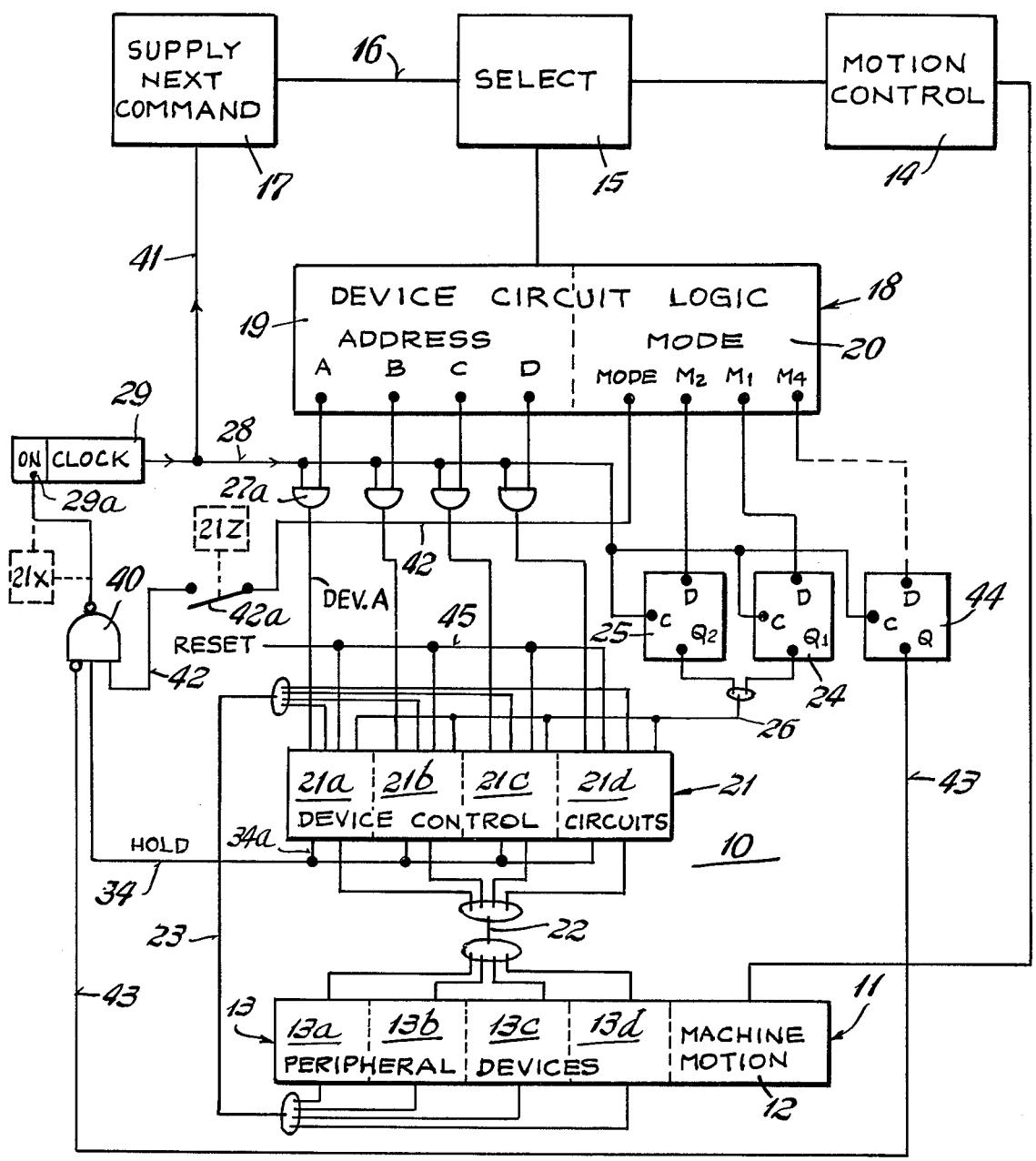

METHOD AND MEANS FOR CONTROLLING ENERGIZATION BY COMMANDS

In automating the operation of machine tools in accordance with input commands, it has generally been found necessary to not only automatically produce the commanded motion but also to effect automatic operation of different peripheral devices on the machine that are required for or during the operation that the machine is performing. The input commands for operation of peripheral devices have sometimes been referred to as the commands for miscellaneous functions in a numerical control system. Thus, for example, in a milling operation, there may be some motion with the tool away from the work and some motion with the tool engaging the work together with the turning on and maintaining on of a coolant when the tool is engaging the work. Energization of these peripheral devices for effecting tool rotation, tool position and coolant operation are preferably automatically controlled and correlated to motion production by miscellaneous function input commands to thereby essentially fully automate the machine.

The numerical control industry has basically standardized the manner in which input commands are to be coded on punched tape or other storage media. One fairly common code uses a specific letter code such as G or M and a number to indicate function commands while those with other code letters like X, Y and Z are motion commands. Most numerical control systems have a plurality of relays that are used to control energization of peripheral devices and a function command heretofore merely consisted of a relay number and the group of relays assigned the number was momentarily actuated. However, in most instances, peripheral devices require more than just a momentary signal, and thus special logic circuitry has been required to be designed and interconnected between the number commanded relays and the devices to assure that proper operation of the devices is achieved from the function commands.

For each different machine tool, basically a different, special logic circuit is required and even with the same tool, if a different operation is desired, in many instances, another special logic circuit may be required. Further, some heretofore numerical control systems have had associated with each relay or assigned an independent function number command, a terminal which received from a peripheral device by way of the logic circuit, a feedback signal of the current status of the peripheral device. Such a feedback signal had been used to inhibit the system from accepting further commands until the feedback signal is changed. Thus, even though miscellaneous function commands are received and momentary signals are provided at specific locations in the system, the connecting of such signals to control the mode of energization of peripheral devices and the receiving of further commands has been troublesome, expensive and non-standardized.

It is accordingly an object of the present invention to provide a method and system having a device control circuit that is capable of functioning in any one of a plurality of modes of energization and in which input commands directly control the mode of energization of the circuit with the circuit maintaining its selected mode until commanded to change its mode.

Another object of the invention is to achieve the above object with a method and system in which there are a plurality of device control circuits, and in which input commands can select, independently of the other circuits, any one of the control circuits and cause only its mode of energization to be controlled by the input commands.

A further object of the present invention is to achieve the above objects by providing two modes of energization, each of which can prevent a subsequent input command from being acted upon, while a selected state of a peripheral device occurs.

Another object of the present invention is to provide a method of coding and a system for responding thereto which enables the input commands to prevent acting on either an immediately subsequent command or a command after a plurality of subsequent commands whereby the former acts on commands sequentially and the latter acts simultaneously on a group of commands.

Still another object of the present invention is to provide a method for uniquely coding input commands and a system for responding thereto which achieves the above objects and yet which is relatively inexpensive, uses a minimum number of bits of input commands, is easily decoded to produce a selected mode for each control circuit and is readily interconnectible with peripheral devices.

Still a further object of the present invention is to provide a method and system in a numerical control machine which accepts input commands for motion control and peripheral device function control and in which peripheral device commands may be acted upon while motion is either also occurring or is discontinued and in which device commands can control the receiving of motion commands.

In carrying out the present invention, the device control system is herein disclosed in conjunction with a numerical controlled machine so that input commands may be used to both produce commanded motion or provide control of the energization of peripheral devices associated with the machine. The input commands are coded as to motion or function energization, as for example, by separation through the use of parenthesis, and a selecting portion directs motion commands to a motion portion of the system while the function commands are directed to the device control portion.

The device control portion includes a plurality of identical device control circuits, each of which has an output capable of attaining one of two states, as for example, an energized state and a deenergized state of a relay and a peripheral device may be connected directly or indirectly to the output and be thus energized or deenergized. Each control circuit is capable of being commanded by input commands to cause its output or relay to assume one of the states and to retain this state until commanded to assume the other state. Thus, the input commands for function control include both a representation of the mode desired and the address of the one control circuit that is commanded to assume that mode.

While there may be as many modes of operations as the complexity of the control circuit and input commands will permit, Applicant has determined that four modes provides a quite adequate variety needed for sufficient flexibility in the energization of most peripheral devices. Moreover, the use of four modes substantially minimizes the complexity of the device control portion and eases the coding and storage of the input commands by only requiring two binary bits in the input commands for mode control selection. With each control circuit being constructed to receive in addition to the two bit mode input command, a two state feedback status signal from a peripheral device, the four modes are 0) deenergize the output relay; 1) energize the relay; 2) deenergize the relay and prevent receiving any further input commands until the feedback status signal becomes a binary logic 0; and 3) energize the relay and prevent receiving further input commands until the feedback status signal becomes a logic 1.

Once a control circuit has acted on a mode command, it maintains that mode until a different mode command is applied to it by another input command. Commands to other control circuits do not affect its mode as each control circuit's mode is independent of all the other circuits. Thus, by the use of the present system and method, many different peripheral devices may be individually maintained energized or deenergized irrespective of the commanding of energization of the other control circuits. A peripheral device may be energized by being directly connected to the output relay instead of requiring that an especially designed logic circuit be interposed between a momentary signal and the peripheral device.

If either mode 2 or 3 is commanded for a control circuit, the system prevents the next subsequent command from being acted upon until the proper feedback status has been attained. This forces the system to act on the commands sequentially, performing the next command only after the prior command has been effected. Alternatively, the system may be made to operate to enable a plurality of control circuits to be energized in these modes simultaneously with the receiving of the subsequent command occurring only after all feedback signals have attained their proper state. The selection of either sequential or simultaneous operation for a command is easily achieved by the manner in which the commands are coded. The flexibility of the standardized system is thus enhanced, enlarging its area of possible useage while decreasing the possible need for special circuits to be associated therewith.

Other features and advantages will hereinafter appear.

In the drawing

FIG. 1 is a block and schematic diagram of the present system for enabling input commands to control energization of a plurality of peripheral devices that are conveniently shown associated with a numerical control machine.

FIG. 2 is a chart showing different mode commands and the energization modes produced in accordance with each command.

Figure 3:
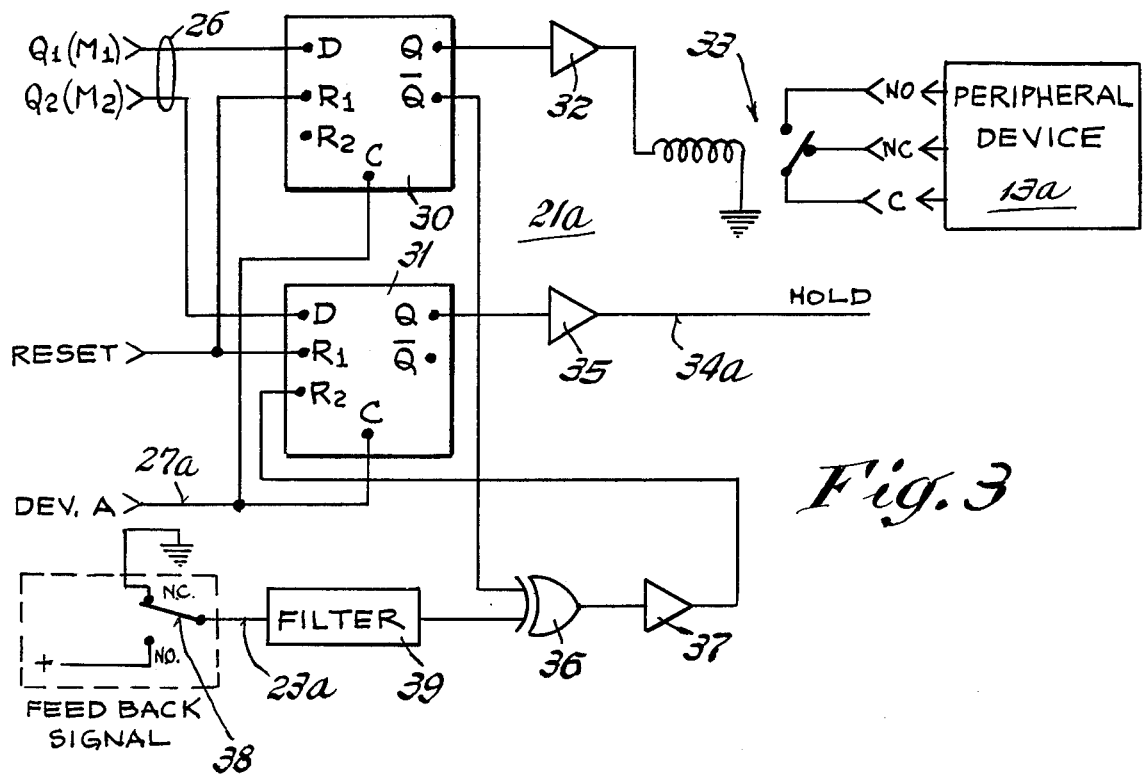
FIG. 3 is a logic and schematic diagram of one of the device control circuits of the present invention.

Referring to the drawing, the system of the present invention is generally indicated by the reference numeral 10 and is shown in conjunction with a numerical controlled machine represented by a block 11 and having a portion 12 denoted "machine motion" which represents the portion of the machine that provides motion along one or more axes. In addition, the machine tool 11 is shown as having four peripheral devices 13a, 13b, 13c, 13d. The peripheral devices may take any specific form as, for example, devices which control and/or sense fluid flow, tool position, work position, motion completion, etc. Thus, a peripheral device may be an energizable device, may be only a status sensing device or may be both.

The system 10 further includes a motion control block 14 which receives motion commands by way of a select block 15 that in turn receives input commands which appear on a lead 16 and are supplied thereto by a block 17 entitled "supply next command". The input commands on lead 16 are supplied in any desired form that is compatible with the system and may be obtained from a storage media such as punched tape, binary memory device or even from a computer output, with the command characters being supplied sequentially in either parallel or serial form. The select block directs input commands which relate to motion control to the motion control block 14 which in turn causes the machine motion 12 to produce the commanded movement.

A device circuit logic indicated by the reference numeral 18 is also interconnected with the select block 15 to receive just peripheral device function commands and includes an address portion 19 and a mode portion 20. The address and mode portions are connected to device control circuits 21 with four such circuits being shown and being indicated by the reference characters 21a, 21b, 21c and 21d. Any control circuit may be connected to any peripheral device and thus such a connection is symbolicly shown by a single lead 22 connecting the outputs of the device circuits 21 to the peripheral devices 13. Moreover, each of the peripheral devices may produce a feedback status signal and any feedback status signal may be connected to any device control circuit 21 so that again a symbolic lead 23 is used to show this interconnection.

The mode portion 20 receives the mode function commands and in one form of the invention wherein only four modes are possible, the commands are in the form of only two binary bits, each of which is capable of being at one or the other of the two binary states. The bits appear on terminals M1 and M2 and are subsequently transferred to the Q terminals of flip-flops 24 and 25, respectively, with the Q terminals being connected in parallel by a lead 26 to each of the device control circuits 21. The flip-flops 24 and 25 are D type flip-flops so that a Q terminal will copy the state of its input D terminal upon receipt of a copy pulse on its C terminal. Thus, the flip-flops 24 and 25 store the mode command and retain it until they are caused to shift to a different state by a different mode command.

As indicated in FIG. 2, one form of mode code which the present invention may utilize is a zero mode when both bits have a binary 0 state and this effects the deenergization of the relay or output of a control circuit; a first mode is commanded when the bit M1 is a 1 and the bit M2 is a 0 with this mode effecting the energization state of the control circuit output; the second mode is when the command has M1 a 0 and M2 a 1 and it effects deenergization of the output and the preventing of the supplying of the next command until a feedback status signal of a binary 0 is achieved (FB→0) and the third mode of operation has a command code of 1 and 1 with the control circuit being caused to have its output energized and the preventing of the supplying of input commands until a feedback status signal achieves a 1 state (FB→1). Each one of the four possible combinations of the binary states on the terminals M1 and M2 is capable of being attained by each control circuit with the one combination on the terminals M1 and M2 being the set mode of operation of the control circuit.

While the mode command is applied to all control circuits simultaneously, the address portion 19 is used to select the one control circuit which is to achieve the mode. Each control circuit has its own address and thus with a five bit address wherein there are 32 different command combinations, any one of 32 control circuits may be individually, uniquely addressed. However, as only four control circuits 21 are shown, the address portion 19 is illustrated as having only four terminals A, B, C and D with the terminal A being connected to the control circuit 21a, terminal B being connected to the control circuit 21b, C to circuit 21c and D to circuit 21d. Each of the connections includes an AND gate, which for the control circuit 21a connection, is indicated by the reference numeral 27a with one input thereof being connected to the A terminal and another input being connected to an output lead 28 of a clock 29. Thus, upon the appearance of a clock pulse on the lead 28 and the address portion providing a binary 1 on the terminal A by reason of the command addressing the control circuit 21a, a pulse will thus be caused to be passed to the control circuit 21a, to cause it to assume the mode dictated by the state of terminals M1 and M2.

The sequence of input commands required in the herein disclosed specific embodiment of the present invention is to initially provide a mode command to all the circuits 21 and then supply the command for the address of the control circuit which is to assume the commanded mode. Though it is contemplated that an address command could be provided initially and followed by a mode command for the addressed control circuit, such a sequence would require in effect, storing the address command until the mode command is received. The present sequence of storing the mode command in the flip-flops 24 and 25 by way of a connection to the clock pulse lead 28 only requires the storing of two bits of information while the storing of the address command would normally require storing perhaps five bits for 32 control circuits. Moreover, having the mode command stored may reduce the quantity of input commands or alternatively differentiate between sequential and simultaneous energization as the same mode command may be directed to more than one control circuit merely by addressing the control circuits as more fully hereinafter set forth.

Shown in FIG. 3 is a block and schematic diagram of the device control circuit 21a, it being understood that all the device circuits 21 are identical. The device circuit includes a pair of D type delay flip-flops 30 and 31 with each flip-flop causing its Q terminal to copy its D terminal's binary state when a signal appears on its C or copy terminal. The state of the flip-flop will so remain until both the sate of a D terminal is different and a copy signal appears on the C terminal when it will shift to the different state. If the state of the flip-flop has its Q terminal a binary 1, the flip-flop may be reset to make the Q terminal a binary 0 by a signal on either its R1 or R2 terminals. The Q terminal will so remain a binary 0 until a binary 1 state is applied to its D terminal and a clock or C pulse appears.

The lead 26 is indicated and subdivided into Q1 (M1) and Q2 (M2) designations. The lead from the output of the AND gate 27a is indicated by the designation DEV.A with the relevant connections thereof to the flip-flops 30 and 31 being shown. For the zero mode wherein both M1 and M2 have a 0 state, the flip-flop 30 will, with a copy signal from the lead DEV.A, cause its Q terminal to be a 0 which through a amplifier 32 causes the coil of a relay 33 to be deenergized. For the first mode, wherein lead M1 is 1 and lead M2 is 0, an address signal to the copy terminal causes the Q terminal of flip-flop 30 to have a 1 state which when amplified by the amplifier 22 effects energization of the relay 33.

A peripheral device, conveniently indicated as peripheral device 13a, is shown adjacent the NO and NC contacts and contact arm C of the relay 33 and is connected to the relay in a manner which provides the desired energization of the peripheral device in accordance with the state of energization of the relay. In some instances, the relay 33 may directly energize the device while in other instances it may serve to operate an intermediate relay or power source if greater power capacity is needed. The output of the control circuit is preferably a relay as it isolates the peripheral device from the control circuit electrically rather than a direct connection to the peripheral device though other two state devices may be used if desired.

The flip-flop 31 is maintained with Q at 0 during the zero and one modes of operation. However, it becomes effective whenever the control circuit is required to be responsive to a feedback status signal as may occur on a lead 23a from the peripheral device 13a (or from some other status sensing source) for the second and third modes. When so energized, the control circuit 21a produces a binary 1 state on a lead 34a, which as will hereinafter become apparent, produces a hold or stop signal to prevent the further supplying of commands while the 1 signal on this lead is present. For the second mode wherein M1 is 0 and M2 is 1, the terminal Q of flip-flop 30 will be a 0 upon the appearance of the address signal DEV.A and the relay 33 is deenergized. Also the terminal Q of flip-flop 31 will assume a 1 state causing a hold signal to appear through an amplifier 35 on the lead 34a.

The hold signal on lead 34a will continue while the feedback signal on the lead 23a is a 1 as both of the inputs to an exclusive OR gate 36 will be 1, the other input being from the flip-flop 30 $\overline{Q}$ terminal. The output of the gate 36 will thus be a logic 0, which is amplified by an amplifier 37 and applied to the R2 terminal of the flip-flop 31. A logic 0 on this terminal does not change the state of the flip-flop 31 and thus the relay 33 remains deenergized and the hold signal on lead 34a is maintained. When the feedback signal becomes a binary 0, however, the inputs to the gate 36 are then 0 and 1 which produces a 1 output therefrom and which, in turn, when applied to the R2 terminal of flip-flop 31, causes the flip-flop 31 to assume its reset state wherein its Q terminal becomes a 0. This eliminates the hold signal on the lead 34a. The flip-flop 30 remains in the same, Q is 0, state.

For the third mode wherein both M1 and M2 have a binary 1 state, the Q terminal of flip-flop 30 will be a 1, energizing the relay 33 while the $\overline{Q}$ terminal thereof, a binary 0, is applied to the gate 36. With respect to the flip-flop 31, its Q terminal is a 1 which produces the hold signal on the lead 34a and this hold signal is maintained as long as the feedback signal on the lead 23a is a 0 in view of both inputs to the gate 36 being a 0 to produce a 0 output therefrom that is applied to the R2 terminal of flip-flop 31. However, when the feedback status signal on the lead 23a changes to a 1, there are two different states on the inputs of gate 36, causing an R2 binary 1 signal, which in turn resets the flip-flop 31 and eliminates the hold signal. The flip-flop 30, however, is again not effected by the change in the feedback signal and it will thus maintain relay 33 energized.

The structure which the peripheral device employs to produce its feedback status signal on the lead 23a is immaterial to the present invention provided it has binary 0 and 1 state values that are compatible with the system. Thus, as shown in FIG. 3 is may merely be a mechanically actuatable switch 38 having its NO contact connected to a positive voltage source of proper value and its NC contact connected to ground so that a binary 0 signal appears except when the switch is actuated and then a binary 1 signal appears. Further, it has been found desirable to provide a filter 39 in the lead 23a for preventing spurious signals, noise or contact bounce from being introduced into the system. It will, of course, be clear that though normally the switch 38 is connected to sense a state of the peripheral device's current status, it is possible to sense the status of a different device or to merely use one control circuit for receiving a feedback signal which may not be associated with a peripheral device.

It will be understood that the mode portion 20 effectively has the state of the two terminals M1 and M2 connected in parallel to all the control circuits so that the mode input commands are applied simultaneously to each circuit 21. However, in view of the manner of operation of the flip-flops 30 and 31, these signals have no effect on the state of these flip-flops and serve merely to condition each circuit until an address signal is applied to a control circuit, such as the address signal on the lead DEV.A. Thus, the mode signal may be given as a common signal for all at any time but yet each device circuit requires input commands of its own address in order to change to the mode dictated by the mode portion.

Referring to FIG. 1, the hold signal lead 34a from the control circuit 21a is indicated, as are the hold leads from the other control circuits with the hold leads being connected in parallel to a single hold lead 34 that constitutes one input to a NAND gate 40. The output of the gate 40 is connected to an "on" terminal 29a of the clock 29 so that whenever a binary 1 is applied to the "on" terminal 29a, the clock operates to produce pulses. Each pulse on the clock output lead 28 is directed by a lead 41 to the "supply next command" block 17 and is used to cause this block to supply the next command over the lead 16 to the select block 15. In addition, clock pulses are also directed on the lead 28 to each of the AND gates such as the gate 27a, connected between the terminal for a control circuit in the address portion 19 and the lead similar to the lead DEV.A of the control circuit 21a. The gate, such as the gate 27a assures that the copy pulse to the control circuits will be a pulse and in synchronism with the receiving of commands.

In the absence of a hold signal from any one of the control circuits, i.e., lead 34 is 0, the NAND gate 40 will cause the clock to operate and the system will continuously read sequential commands and cause the selected modes to be addressed to the proper control circuits. However, when a lead 34 has a binary 1, the clock is stopped by the NAND gate's output being a 0 and thus prevents the supplying of further commands while the lead 34 has this state.

If the addresses are denoted by a letter and the mode by a numeral, then the commands 1A1B2C3D1E will cause, sequentially, the output of circuit A to be energized, circuit B to be energized, circuit C to be deenergized and the next command 3D prevented from being supplied until the feedback signal to circuit C becomes 0. Then command 3D is supplied causing circuit D to be energized and the next command 1E is prevented until circuit D's hold lead attains a 1 state by the feedback signal changing from a 0 to a 1. Finally the output of the circuit E is energized. The outputs of circuits A,B and D will remain energized and the circuits C and E deenergized until commands are provided to change their states. It will be noted that in this sequence of commands, the mode and the circuit address sequentially alternately follow each other with there being one mode command supplied and then followed immediately by one circuit address.

If commands of 1A1B1C1D1E2F are desired, the extent of the input commands may be reduced to 1ABCDE2F and the five circuits caused to assume the first mode energization since there is no change in the mode command. If on the other hand it is desired to provide commands of 2A2B2C2D2E3F for example, then the command 2A will be acted on and the command 2B would be supplied only after the feedback signal of circuit A has achieved the binary 0 state. Then the command 2C would be suspended until the hold signal was removed from the hold lead on the circuit B at which time command 2C would become effective. Thus, each command is not acted on until the previously commanded hold signal had been removed. The circuits will thus become controlled sequentially, each one only after the completion of the prior command. Also in this instance, a command of 2ABCDE3F will produce the same sequential result even though the input commands are reduced in extent.

If, however, it is desired to have circuits A,B,C,D and E all simultaneously assume the mode two energization and to prevent the command 3F from being read until all five circuits have had their hold signals removed, then the system may include a lead 42 connected as another input to the NAND gate 40 and to the output of a "mode" terminal in the mode portion 20. A switch 42a may be connected in the lead 42 to place the lead in or effectively remove it from the system. With the switch 42a closed, the lead 42 will only have a 1 state whenever a mode command is being supplied and a 0 state when an address command is supplied. Thus a hold lead 34 1 state and a 0 state on the lead 42 will produce a 1 to the clock 29 to cause it to continue to supply pulses.

With the switch 42 closed and if commands are coded 2A2B2C2D3E, the system will act on each sequentially as explained above. If commands are coded 2ABCD3E, then the circuits A,B,C and D will be energized in the two mode and the 3E command prevented from occurring until the hold signal from all of the four circuits is eliminated. The hold signal thus does not become effective until the next mode command occurs. The use of the lead 42 enables the system to have commands coded in a manner which permits a plurality of control circuit hold signals to simultaneously occur. The code programmer may thus by the way in which the modes and addresses are coded either provide sequential operation or simultaneous identical operation of a plurality of control circuits. It will be understood that the switch 42a may be operated manually or may if desired be connected to the output of its own control circuit (shown in dotted lines and denoted 21z) to enable input command operation thereof.

As an alternative to the above operation wherein there are four modes, a third bit may be added in the mode command and the lead 42 eliminated to enable selection of a sixth mode wherein the second mode results but the hold signal is suspended and a seventh mode which results in the third mode energization occuring but with the hold signal being suspended. Using the third bit as an alternative to the lead 42, commands of 2A2B2C2D3E or 2ABCD3E will both be acted upon sequentially. Commands of 6A6B6C6D3E or 6ABCD3E will have circuits A,B,C and D energized simultaneously and 3E not acted upon until all the hold signals from circuits A,B,C and D have been eliminated.

For enabling use of the six and seven modes, the NAND gate 40 has an input lead 43 that is connected to the Q terminal of a D type delay flip-flop 44 which in turn is connected to an M4 terminal in the mode portion 20. Thus any command having a six or seven mode causes the lead 43 to be a binary 1 which effects suspension of a hold signal until a command having a 0, 1, 2 or 3 mode is read at which time the suspension of further commands will become effective until all hold signals from the commanded circuits are removed. Thus, the lead 42 and the lead 44 basically accomplish the same effect by permitting simultaneous operation of the number of circuits each calling for a hold with the former effecting it by "anding" the hold signal with a mode command while the latter uses one additional mode bit. The one additional advantage obtained by the additional mode is that the group of simultaneously acting circuits can include modes six and seven while lead 42 only permits a group of one mode. It is contemplated that the system may employ both types of hold suspension in order to provide greater flexibility in producing commands.

As a further alternative to lead 42 or the third bit, one of the control circuits, such as circuit 21X may have its output connected to supply a binary 1 signal to the terminal 29a and to open the lead from the output of the gate 40 when the circuit is energized. When it is deenergized it will maintain the connection between the NAND gate output and the terminal 29a. Whenever a command of 0X occurs, the system will function as above described while a command of 1X will direct the clock to continue operating and commands acted upon until a command of 0X is read wherein a hold signal, if present, suspends further commands. Such a circuit, while increasing the extent of the commands, eliminates any limitation on the modes of the group that are simultaneously commanded.

There is further shown in FIG. 1 a lead 45, entitled "reset," which is connected in parallel to all the device control circuits and serves to reset all of them to the zero mode whenever desired, as may occur when the system is initially energized.

While as heretofore mentioned, any type of coding may be employed it has been found desirable to utilize a U.S. standard code of 7 bits per character and to utilize numbers for the modes i.e., 0, 1, 2, 3, 6 and 7 and to use letters of the alphabet for the address of the control circuits. Thus, the zero mode may have a command code of 0110000; the two mode 0110001; the three mode 0110010; the six mode 0100110 and the seven mode 0110111. For the letter A, the standard code employs the seven bit binary representation of 1000001; for the letter B, 1000010, etc. With such a code, the device circuit's logic 18 may be constructed as a programmable read only memory in which coded numerals provide energization of the mode portion and coded letters provide energization of the one circuit terminal corresponding to the letter command.

In accordance with one form of code used in numerical control machinery motion commands are separated from function commands by placing function commands within parenthesis. Thus, if there are motion and function commands, for example X200Y200 (1A2B1C6-F)E0BX400Y300E0B, etc., the select circuit passes the motion commands to the motion control block 14 until it encounters the open parenthesis command. Subsequent commands are then directed by the select block 15 to the device circuit logic 18, until a command of a closed parenthesis occurs. Commands thereafter are then again directed to the motion control 14 as they are motion commands. Thus, the select block merely requires sensing the presence of the parenthesis commands and using said commands to determine where the commands are to be directed.

While in the given example of using the standard code, seven bits (plus parity) are provided for each command, it will be understood that twice as many, i.e., 16 may be given per command if desired, with the first half being solely mode and the latter half solely address. Also the commands could be provided sequentially from disc storage, magnetic tape, a computer output, or a programmed memory if desired.

It has been found that the frequency of a clock 29 is essentially dependent upon the rate at which the supply next command blocks 17 operate. As, for example, with a punched tape reader capable of operating only 125 characters per second, the clock would have essentially this rate. On the other hand, if commands are stored in a disc storage or if received from a computer then the rate could be substantially higher.

In the specific embodiment of the invention described, the command that is held has been received by the device's logic portion if a function command and the hold, by not permitting a clock pulse to occur, prevents the system from acting on this held command. The gates, such as the gate 27a, requires a clock pulse to transmit the command. Thus, while this description of the invention refers to preventing the supplying of further commands it also includes the preventing of the command in the logic from being acted upon.

Figure 4:
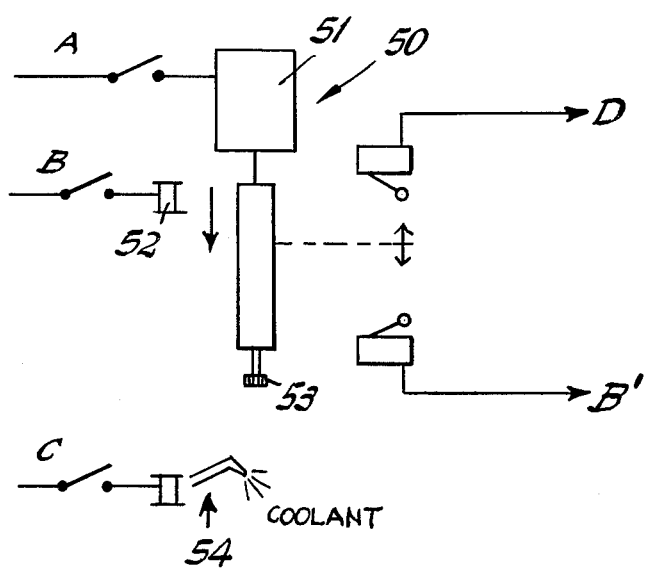
FIG. 4 is a diagram of a milling machine and associated peripheral devices.

As an example of the use of a present control system, reference is made to FIG. 4 in which there is diagrammatically shown a milling machine 50 having a spindle motor 51, means 52 for moving the spindle up and down with the spindle carrying a rotatable tool 53. Coolant flow is indicated by the reference numeral 54 with a switch C, when closed, causing coolant flow and, when open, stopping coolant flow. A switch B, when closed, energizes the means 52 to move the spindle down while, when open, energizes the means to move the spindle up. A switch A, when closed, causes spindle motor 51 rotation and when open, ceases the rotation. A monitoring switch, also denoted by the letter B', is closed when the spindle is all the way down while another monitoring switch D is closed when the spindle is fully up.

One type of milling operation is to energize the spindle motor, start the coolant flow and bring the spindle down, maintain the spindle down until the desired milling operation is complete and then the spindle is moved up and the spindle motor and coolant are deenergized. With the present system, if switch A is connected to control circuit A, energizing switch B and monitoring switch B' connected to control circuit B, switch C connected to control circuit C and switch D connected to control circuit D then a command of (1A 1C 3B) X200, Y200 will turn on the spindle motor, cause coolant flow, and move the spindle down. Motion commands are prevented until monitoring switch B' is actuated. The machine motions for the milling operation may then be produced by the system. After the milling motion has been completed a command of 0B, 3D, 0A, 0C will cause the spindle to move up and further commands suspended until the switch D is actuated at which time the spindle motor and the coolant are then turned off. It will thus be seen that the present system may be easily incorporated with a machine and provide the necessary flexibility for controlling the peripheral devices on the machine by input commands.

As used herein, a control circuit is a circuit that is uniquely identifiable, capable of being individually addressed by input commands and capable of independent energization. Naturally, if desired more than one peripheral device may be operated by one control circuit if simultaneous control of their energization is desired.

While specific reference has been made to a relay, it will be understood that other devices which operate to provide two different states may be employed instead. Moreover, while in most instances, energization of the relay will effect, either directly or indirectly energization of its peripheral device, it is also possible, for example, by using the NC contact on the relay instead of the NO contact to have a relay state of deenergization produce an energization state of the peripheral device.

Though it is preferred that the present peripheral device input command control system be a part of a numerical control system that produces motion, it should be understood that the device control system could be supplied as a separate system for cooperation with an existing motion system instead of being supplied with a motion system. Moreover, depending on the desires of a user, the system may be used independently of any motion system.

While the device control circuits have been described as being connected to peripheral devices, it is contemplated that included within such generally expressed devices are the use of the state of one control circuit to provide a feedback signal to another control circuit, the use of a control circuit to actuate a timer for providing a set duration, etc.

It will be understood that there has been disclosed a method and system which is capable of controlling the energization of peripheral devices in accordance with input commands. The system has a plurality of activated control circuits with each having an output connected to its associated peripheral device for effecting energization or deenergization thereof and for permitting or stopping the receipt of the next command. The input commands can select any one of four modes of energization of each control circuit and each control circuit is uniquely identified by its own address command. Thus, by having the input commands contain the mode and the address, each control circuit may thus be independently operated. Further, the system may suspend the stopping signal by an input command until commanded to remove the suspension to thereby enable a plurality of stopping signals to be simultaneously actuated and to stop further commands until the last stopping signal disappears. Thus, various operations of the peripheral devices may be commanded by input commands which may be intermixed with motion commands to thereby provide essentially full automation of a numerical controlled machine.

Variations and modifications may be made within the scope of the claims and portions of the improvements may be used without others.

I claim:

1. A device control system for enabling mode and circuit identifying input commands to control the mode of operation of any one of a plurality of independent control circuits comprising a plurality of control circuits with each circuit having an output that is capable of assuming one of two different states dictated by the mode input commands and with each circuit being uniquely identifiable by circuit identifying input commands, means for receiving a mode input command of one state, means for receiving an identifying input command uniquely identifying one of the circuits, means for shifting the state of the output of the one identified circuit to the state dictated by the mode input command, means for retaining the state of the one control circuit output until input commands are received which both dictate a different state and have the same unique identifying command and in which there is a series of sequential input commands, supply means for sequentially supplying input commands in the absence of a stopping signal, in which a feedback signal means is associated with the one identified control circuit for receiving a feedback signal shiftable between two states, in which there are signal means in the one control circuit responsive to one state of the feedback signal for supplying a stopping signal to the supply means only for the duration that the one state of the feedback signal is received and in which an input mode command dictates the state of the feedback signal to which the signal means is to be responsive.

2. The invention as defined in claim 1 in which the signal means is responsive to a feedback signal of one of two different states, in which the input mode command includes another binary bit dictating the state of the feedback signal to which the signal means is to be responsive and in which the control circuit causes the signal means to be responsive only to the one dictated state of the feedback signal.

3. The invention as defined in claim 2 in which the control circuit has an output of one state and in which the control circuit is limited to causing the signal means to be responsive to only the other state of the feedback signal.

4. The invention as defined in claim 2 in which the means for receiving the mode commands includes means for maintaining as binary bits the input command for the state of a control circuit output and the feedback signal and in which said maintaining means maintains the same binary bits until changed to different binary bits by a subsequent mode command.

5. The invention as defined in claim 1 in which there are a number of identical control circuits with each having a feedback signal terminal and signal means, in which the means for receiving the mode command includes means for conditioning the number of control circuits to have their signal means be responsive to the one state of the feedback signal set forth in the mode command and in which there are means for enabling only the one control circuit addressed by the input command to become effective to provide a stopping signal.

6. The invention as defined in claim 1 in which the system includes blocking means for blocking the stopping signal from being supplied to the supply means while the blocking means are actuated.

7. The invention as defined in claim 6 in which the series of sequential input commands includes a first mode command followed by a plurality of circuit identifying commands and a second mode command and in which there are means for actuating the blocking means only until the second mode command is received whereby a plurality of stopping signals may occur simultaneously.

8. The invention as defined in claim 6 in which there are means for actuating the blocking means which includes another control circuit uniquely identifyable by input commands.

9. The invention as defined in claim 6 in which the mode command includes a third binary bit and in which the means for actuating the blocking means includes means for sensing the presence of one state of the third bit and maintaining the actuation until a mode command is received having the other state of the third bit.

10. The method of independently controlling the energization of a plurality of peripheral devices in accordance with input commands comprising the steps of connecting each peripheral device to a different output, limiting the state of each output to being in either one or another state, identifying each output by a unique address, providing a command consisting of one binary bit and the unique address of one output, causing the output so addressed to assume the state dictated by the binary bit and retaining the state of the output until a different binary bit and the same unique address appears in the commands and in which there is the step of providing at least two consecutive unique output addresses in the input commands and in which there is the step of causing the output so addressed by the second address to assume the same state as the output of the circuit identified by the first mentioned address.

11. The method of independently controlling the energization of a plurality of peripheral devices in accordance with input commands comprising the steps of connecting each peripheral device to a different output, limiting the state of each output to being in either one or another state, identifying each output by a unique address, providing a command consisting of one binary bit and the unique address of one output, causing the output so addressed to assume the state dictated by the binary bit and retaining the state of the output until a different binary bit and the same unique address appears in the commands and in which there is the step of providing sequentially a series of input commands, in which there is the step of associating a feedback signal with one output with the feedback signal having one or the other state, providing a command of a second binary bit with the first binary bit of a state of the feedback signal and stopping the providing of further input commands for the duration that the feedback signal has the state dictated by the second binary bit when the output with which the feedback signal is associated is addressed.

12. The invention as defined in claim 11 in which there is the step of providing a plurality of outputs with each of which a feedback signal is associated and causing each feedback signal to be independent of any other feedback signal.

13. The invention as defined in claim 11 in which there is the step of providing an input command that blocks the step of stopping of the providing of further input commands, whereby further input commands are continued until the blocking step is removed.

14. The invention as defined in claim 13 in which the series of sequential commands includes a command having a third binary bit and a plurality of unique addresses whereby each circuit addressed is responsive to its own feedback signal, in which the step of blocking is provided for at least two unique addresses and then removed, and in which the step of stopping remains effective for a duration necessary to have all of the feedback signals from the unique addresses attain the state dictated by the input command.

15. A numerical controlled machine for producing motion and controlling the energization of at least one peripheral device in accordance with input commands for motion and energization comprising means for supplying the input commands, means for separating the commands into motion commands and an energization command, means for receiving the motion commands and producing motion in accordance with the motion commands and means for receiving the energization command and energizing the peripheral device in accordance with the energization command, said receiving and energizing means including a device control circuit having an output capable of attaining one of two different states and being connected to the peripheral device, means in the control circuit for receiving an energization command of one of its states and means for causing the output to attain the state dictated by the energization command and to retain the said state until dictated by an energization command to shift to its other state, and in which there is a sequential series of input commands and the supplying means supplies the commands sequentially, means for stopping the supplying means of input commands upon receipt of a stop signal, means for providing a feedback signal that is shiftable between two states to the control circuit, means for receiving an input command of a state of the feedback signal and in which the control circuit includes means for providing a stop signal to the stopping means for the duration that the feedback signal is of the state called for by the input command.

16. The invention as defined in claim 15 in which there are a plurality of identical control circuits, in which a plurality of feedback signals are provided, in which each feedback signal is directed to only its own control circuit, in which the energization commands are directed to a number of control circuits and in which only the control circuit having an energization command directed thereto can provide a stop signal.

17. The invention as defined in claim 16 in which the system includes blocking means for blocking the stopping signal to the supplying means for the time that the blocking means is actuated.

18. The invention as defined in claim 17 in which the system includes means responsive to input commands for maintaining the stop signal for a duration equal to the longest duration stop signal from the number of control circuits.

19. A system for using binary coded input commands to control energization of a two state output and the stopping of the supplying of sequentially supplied input commands by the use of two binary bits in the input command and a binary feedback signal comprising means for supplying input commands sequentially means for receiving a stop signal and stopping the supplying means for the existence of the stop signal and a control circuit means, said control circuit means having an output, a feedback signal terminal for receiving a feedback signal capable of having only two states, a stop signal producing means for producing a stop signal and a pair of input terminals with each input terminal being connected to receive a binary bit with the bits forming four different sets with one set of bits causing the output to assume one state; a second set of bits causing the output to assume the other state; a third set of bits causing the output to assume a state and enable the stop signal producing means to produce a stopping signal that is maintained while the feedback signal is of a state and a fourth set of bits causing the output to assume the other state and enable the stop signal producing means to produce a stopping signal that is maintained while the feedback signal is of the other state.

20. The invention as defined in claim 19 in which the control circuit means causes the output to maintain the state which it was caused to assume until a set of binary bits is received that causes it to assume a different state.

21. The invention as defined in claim 19 in which the third set has the output state different from the feedback signal state.

22. The invention as defined in claim 19 in which the fourth set has the output state different from the feedback signal state.

23. The invention as defined in claim 19 in which the command includes a third binary bit and in which there are means for receiving one state of the third bit to block all stopping signals when the third bit is combined in a command with the third and fourth sets of bits.

* * * * *